United States Patent
Nara et al.

(10) Patent No.: US 9,080,884 B2
(45) Date of Patent: Jul. 14, 2015

(54) NAVIGATION DEVICE, SERVER DEVICE, NAVIGATION SYSTEM AND PROGRAM

(75) Inventors: Norikazu Nara, Chiba (JP); Noriyuki Abe, Kanagawa (JP); Takashi Shioya, Tokyo (JP); Kimio Okamoto, Kanagawa (JP); Hiroaki Takatsuki, Tokyo (JP); Takaaki Ishii, Kanagawa (JP)

(73) Assignee: CLARION CO., LTD., Tokyo (JP)

( * ) Notice: Subject to any disclaimer, the term of this patent is extended or adjusted under 35 U.S.C. 154(b) by 290 days.

(21) Appl. No.: 13/386,071

(22) PCT Filed: Jul. 28, 2010

(86) PCT No.: PCT/JP2010/062660
§ 371 (c)(1),
(2), (4) Date: May 2, 2012

(87) PCT Pub. No.: WO2011/013687
PCT Pub. Date: Feb. 3, 2011

(65) Prior Publication Data
US 2012/0209523 A1   Aug. 16, 2012

(30) Foreign Application Priority Data
Jul. 31, 2009  (JP) .................. 2009-179148

(51) Int. Cl.
*G01C 21/00* (2006.01)
*G01C 21/26* (2006.01)
(52) U.S. Cl.
CPC ...................................... *G01C 21/26* (2013.01)
(58) Field of Classification Search
USPC ......... 701/400, 522, 537, 538; 340/5.61, 5.64
See application file for complete search history.

(56) References Cited

U.S. PATENT DOCUMENTS

| 7,176,813 | B2 * | 2/2007 | Kawamata et al. | ...... 340/995.13 |
|---|---|---|---|---|
| 7,546,608 | B2 * | 6/2009 | Branigan et al. | ............. 719/318 |
| 2002/0026500 | A1 * | 2/2002 | Kanefsky et al. | ............. 709/219 |
| 2003/0043019 | A1 * | 3/2003 | Tanaka et al. | ................. 340/5.64 |
| 2008/0021633 | A1 * | 1/2008 | Naito et al. | .................... 701/200 |
| 2014/0100740 | A1 * | 4/2014 | Chutorash et al. | ............. 701/36 |

FOREIGN PATENT DOCUMENTS

| JP | 2002-144982 | 5/2002 |
|---|---|---|
| JP | 2003-77092 | 3/2003 |
| JP | 2004-258371 A | 9/2004 |
| JP | 2004-333319 | 11/2004 |

(Continued)

OTHER PUBLICATIONS

Notification of Reasons for Refusal dated Sep. 3, 2013 from related Japanese Application No. 2009-179148, together with an English language translation.

*Primary Examiner* — Rami Khatib
(74) *Attorney, Agent, or Firm* — Scully, Scott, Murphy & Presser, P.C.

(57) ABSTRACT

Provided is a navigation technique which allows a person other than a user who received a route guide to operate a navigation device through an interaction process. The navigation device is characterized by being provided with an instruction reception unit, a process unit, and an output unit. The instruction reception unit receives an instruction for a process from an external device. The process unit executes a process in accordance with the instruction received by the instruction reception unit. The output unit outputs output information which is obtained as the result of the process executed by the process unit.

11 Claims, 10 Drawing Sheets

(56) References Cited

FOREIGN PATENT DOCUMENTS

| | | |
|---|---|---|
| JP | 2005-147992 | 6/2005 |
| JP | 2007-205872 | 8/2007 |
| JP | 2009-025204 | 2/2009 |
| JP | 2009-69015 A | 4/2009 |
| JP | 2009-143373 | 7/2009 |

* cited by examiner

Fig.2

Navigation model information table 400

| Communication destination 401 | Model ID 402 | Operation conversion pattern 403 | Display screen design 404 |
|---|---|---|---|
| | | | |
| | | | |
| | | | |

Fig.3

Remote control operation conversion table 410

| Operation conversion pattern 411 | Remote control operation ID 412 | Instruction ID 413 |
|---|---|---|
| | | |
| | | |
| | | |

Operation history table 420

Link table 200

Command conversion table 250

| Instruction ID | Execution command |
|---|---|
|  |  |
|  |  |
|  |  |

1

NAVIGATION DEVICE, SERVER DEVICE, NAVIGATION SYSTEM AND PROGRAM

TECHNICAL FIELD

The present invention relates to a technology of a navigation device. The present invention claims priority of Japanese Patent Application No. 2009-179148 filed on Jul. 31, 2009, and the contents described in that application are incorporated herein by reference with regard to the countries for which it is permitted.

BACKGROUND ART

Conventionally, a navigation device employs a technique in which route guidance is performed by receiving input from a user whose route is to be guided by the navigation device. That is to say, operation of operating switches on a main unit or switching operation of a remote control is received as input information. Patent Document 1 describes a technique relating to such a navigation device.

Patent Document 1: Japanese Unexamined Patent Application Laid-Open No. 2009-143373

DISCLOSURE OF THE INVENTION

It is difficult, however, for a navigation device as described above to receive, through interactive processing, input information from another user than the user whose route is to be guided. For example, there is a technique for an information center to control remotely setting a destination in a navigation device used by a user when the information center receives a request from the user. In such a technique, an operation unit is different from the interface of the navigation device in question and processing is not performed as interactive processing.

An object of the present invention is to provide a navigation technique that allows operation of a navigation device through interactive processing by another person than a user whose route is to be guided.

To solve the above problems, a navigation device according to the present invention comprises: an instruction receiving unit adapted to receive, from an external device, a processing instruction; a processing unit, which performs processing according to the instruction received by the instruction receiving unit; and an output unit adapted to output output information obtained as a result of the processing performed by the processing unit.

Further, a server device according to the present invention comprises: a navigation device communication unit adapted to communicate with a navigation device; a client communication unit adapted to communicate with a client computer; a remote control operation receiving unit adapted to receive a remote control operation from the client computer through the client communication unit; an operation instruction unit adapted to specify an operation instruction corresponding to the remote control operation received by the remote control operation receiving unit, and sends the specified operation instruction to the navigation device through the navigation device communication unit; and an output processing unit adapted to receive output information as a result of the operation instruction through the navigation device communication unit, and sends the output information to the client computer through the client communication unit.

Further, a navigation system according to the present invention is a navigation system comprising a navigation device, a server device and a client computer, wherein: the navigation device comprises: a communication unit adapted to communicate with the server device through a communication network; an instruction receiving unit adapted to receive a processing instruction from the server device through the communication unit; a processing unit adapted to perform processing according to the instruction received by the instruction receiving unit; and an output sending unit adapted to send output information obtained as a result of the processing performed by the processing unit; the server device comprises: a navigation device communication unit adapted to communicate with the navigation device through the communication network; a client communication unit adapted to communicate with the client computer; a remote control operation receiving unit adapted to receive a remote control operation from the client computer through the client communication unit; a processing instruction unit adapted to specify a processing instruction corresponding to the remote control operation received by the remote control operation receiving unit, and sends the specified processing instruction to the navigation device through the navigation device communication unit; and an output processing unit adapted to receive the output information through the navigation device communication unit, and sends the output information to the client computer through the client communication unit; the client computer comprises: an input receiving unit adapted to receive input from a user; an output processing unit adapted to output to the user; a server device communication unit adapted to communicate with the server device through the communication network; and a remote control operation sending unit adapted to send input information concerning a remote control operation, the input information being received from the user through the input receiving unit, to the server device through the server device communication unit; and the output processing unit outputs the output information received from the server device through the server device communication unit.

Further, the present invention provides a program for a navigation device, wherein: the navigation device comprises a control unit; and the program makes the control unit carry out: an instruction receiving step, in which a processing instruction is received from an external device; a processing step, in which processing according to the instruction received in the instruction receiving step is performed; and an output step, in which output information obtained as a result of the processing performed in the processing step is outputted.

BRIEF DESCRIPTION OF DRAWINGS

FIG. 2 is a diagram showing structure of a navigation model information table;

FIG. 3 is a diagram showing structure of a remote control operation conversion table;

BEST MODE FOR CARRYING OUT THE INVENTION

Figure 1:
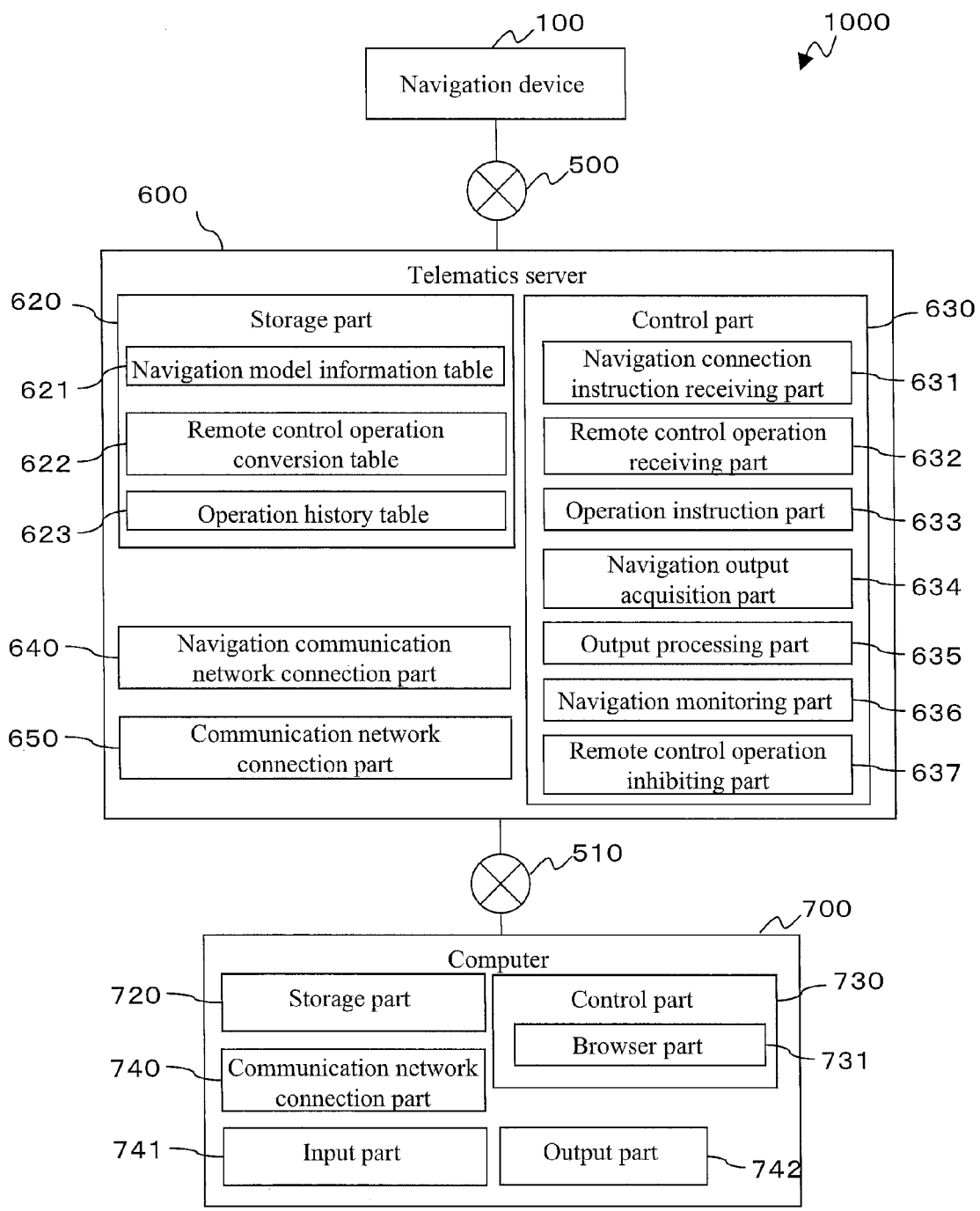
FIG. 1 is a schematic diagram showing a navigation system.

Now, a navigation system to which one embodiment of the present invention is applied is described referring to the drawings.

FIG. 1 is a diagram showing an entire configuration of a navigation system 1000.

The navigation system 1000 is a system comprising: a navigation device 100; a telematics server 600 that can connect with the navigation device 100 through a first network 500; and a computer 700 that can connect with the telematics server 600 through a second network 510.

Here, the first network 500 is a wide-area radio communication network such as a mobile telephone network (hereinafter, the first network 500 is called navigation communication network 500). The second network 510 is a wide-area radio communication network or a wide-area communication network that can be connected with an open network such as the Internet, and includes a mobile telephone network and an Internet provider network (hereinafter, the second network 510 is called communication network 510). Of course, the navigation communication network 500 or the communication network 510 may be a communication network that can be used only by certain people, such as one of various types of Local Area Network (LAN) or Wide Area Network (WAN). Or the navigation communication network 500 and the communication network 510 may be networks connected with each other, or may be the same network.

The navigation device 100 is an ordinary navigation device that can display map information to show a point indicating a present location of the navigation device 100 and information for guidance along a route to a set destination. The navigation device 100 can communicate with the telematics server 600 through the navigation communication network 500, and can send information such as a state of use of the navigation device 100 to the telematics server 600. Further, in response to a connection request from the telematics server 600, the navigation device 100 starts connection for remote control, performs processing according to remote control operations, and sends output information including a screen of processing result and the like to the telematics server 600.

The telematics server 600 intermediates input-output information between the navigation device 100 and the computer 700. In detail, on receiving an instruction from the computer 700 through the communication network 510 to connect with the navigation device 100, the telematics server 600 connects with the navigation device 100 through the navigation communication network 500. When the telematics server 600 obtains output information such as an operation screen from the navigation device 100, the telematics server 600 sends the output information to the computer 700, to receive a remote control operation directed to the navigation device 100 from the computer 700. Then, the telematics server 600 identifies an instruction corresponding to the remote control operation, and sends the instruction to the navigation device 100. Then, from the navigation device 100, the telematics server 600 obtains output information as a result of the instruction, and sends the output information to the computer 700. Further, at that time, when information is received from the navigation device 100 to the effect that the remote control operation is impossible, the telematics server 600 sends the information to the computer 700, to interrupt the remote control operation.

The telematics server 600 comprises a storage part 620, a control part 630, a navigation communication network connection part 640, and a communication network connection part 650. The storage part 620 comprises a navigation model information storage area 621, a remote control operation conversion information storage area 622, and an operation history storage area 623.

The storage part 620 stores a navigation model information table 621 for storing an input-output interface information processing system corresponding to a model of the navigation device 100 as a communication destination, a remote control operation conversion table 622 for identifying specific conversion information for conversion between a remote control operation and an instruction, and an operation history table 623 for storing history information concerning received remote control operations.

The navigation model information table 621 is constructed as the navigation model information table 400 shown in FIG. 2. In detail, the navigation model information table 400 stores: a communication destination 401, which stores information identifying the navigation device 100 with which communication is performed; a model ID 402, which stores information identifying the model of the navigation device 100 as the communication destination; an operation conversion pattern 403, which identifies an operation conversion pattern as a set of rules for converting a remote control operation sent from the computer 700 into instruction information; and a display screen design 404, which specifies information on a display screen for displaying on the computer 700 a screen sent from the navigation device 100.

For example, the communication destination 401 stores information that specifies an individual number of the navigation device 100 or a unique number (such as a mobile phone number) of a communication device connected to the navigation device 100. Further, the model ID 402 stores information such as a model number, i.e. information for identifying the interface of the navigation device 100. Usually, the operation conversion pattern 403 and the display screen pattern 404 store values that are previously associated with the model ID 402.

The remote control operation conversion table 622 is constructed as the remote control operation conversion table 410 shown in FIG. 3. In detail, the remote control operation conversion table 410 stores: an operation conversion pattern 411, which identifies a pattern of rules for converting a remote control operation sent from the computer 700 into instruction information to the navigation device 100 as the communication destination; and a pair of pieces of information, i.e. a remote control operation ID 412 and an instruction ID 413 associated with the operation conversion pattern 411.

The pair of pieces of information, the remote control operation ID 412 and the instruction ID 413 are each information that specifies a conversion rule from the remote control operation ID stored in the remote control operation ID 412 into the instruction ID 413. Each remote control operation ID 412 stores information for specifying an operation sent from the computer 700, and each instruction ID 413 stores information for specifying an instruction sent to the navigation device 100.

Figure 4:
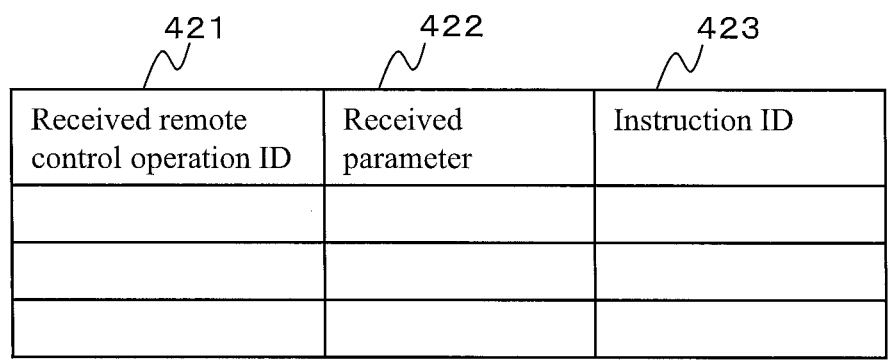
FIG. 4 is a diagram showing structure of an operation history table.

The operation history table 623 is constructed as the operation history table 420 shown in FIG. 4. In detail, the operation history table 420 stores: a received remote control operation ID 421, which specifies a remote control operation ID as information identifying the content of a remote control operation received by the telematics server 600 from the computer 700; a received parameter 422, which specifies parameter information added at the time of the remote control operation in question; and an instruction ID 423, which identifies an instruction directed to the navigation device 100, the instruction being converted from the remote control operation identified by the remote control operation ID 421.

For example, the received remote control operation ID 421 stores a remote control operation ID identifying a remote control operation meaning "to scroll the map up on the screen", and the received parameter 422 stores a parameter (for example, "one page") meaning "a scrolling increment is one screenful area". The instruction ID 423 stores an instruction (for example, "scroll-up") directed to the navigation device 100, the instruction corresponding to the received remote control operation ID 421.

The control part 630 comprises a navigation connection instruction receiving part 631, a remote control operation receiving part 632, an operation instruction part 633, a navigation output acquisition part 634, an output processing part 635, a navigation monitoring part 636, and a remote control operation inhibiting part 637.

When the navigation connection instruction receiving part 631 receives instruction information to start remote control of the navigation device 100 from the computer 700, the navigation connection instruction receiving part 631 sends a connection start request to the navigation device 100. The remote control operation receiving part 632 receives a remote control operation and its parameters directed to the navigation device 100 from the computer 700. The operation instruction part 633 converts a remote control operation received by the remote control operation receiving part 632 into an instruction that the navigation device 100 can carry out, and sends the converted instruction to the navigation device 100.

The navigation output acquisition part 634 receives output sent from the navigation device 100. The output processing part 635 converts output received by the navigation output acquisition part 634 such that the computer 700 can reproduce it, and sends the converted output information to the computer 700. In this conversion processing, the output processing part 635 generates display information embedded with output information to display on the computer 700, such as information embedded with a screen display of Hyper Text Markup Language (HTML) format or the like, speech display, a script or the like for receiving an operation and its parameters, and the like.

The navigation monitoring part 636 monitors the state of the navigation device 100 periodically. For example, during connection with the navigation device 100, the navigation monitoring part 636 periodically sends information to (polls) the navigation device 100 for inquiring whether it is in a condition allowing communication with the navigation device 100, and receives response information to judge whether it is in a condition allowing communication.

When the navigation monitoring part 636 judges that the navigation device 100 is not in a condition allowing communication, the remote control operation inhibiting part 637 makes the computer 700 interrupt the remote control operation. In detail, when response information cannot be received from the navigation device 100, the remote control operation inhibiting part 637 makes the computer 700 display, on its screen, message information to the effect that the remote control is impossible due to communication failure such as one resulting from moving through a tunnel, and inhibits input of a remote control operation. Also when a remote control operation by the navigation device 100 is not appropriate such as in the case where polling response information is "guiding at an intersection" or "user (traveler) is operating", the remote control operation inhibiting part 637 makes message information be displayed on the screen of the computer 700 similarly.

The navigation communication network connection part 640 starts and ends communication with the navigation communication network 500, and performs sending and receiving.

The communication network connection part 650 starts and ends communication with the communication network 510, and performs sending and receiving.

Figure 5:
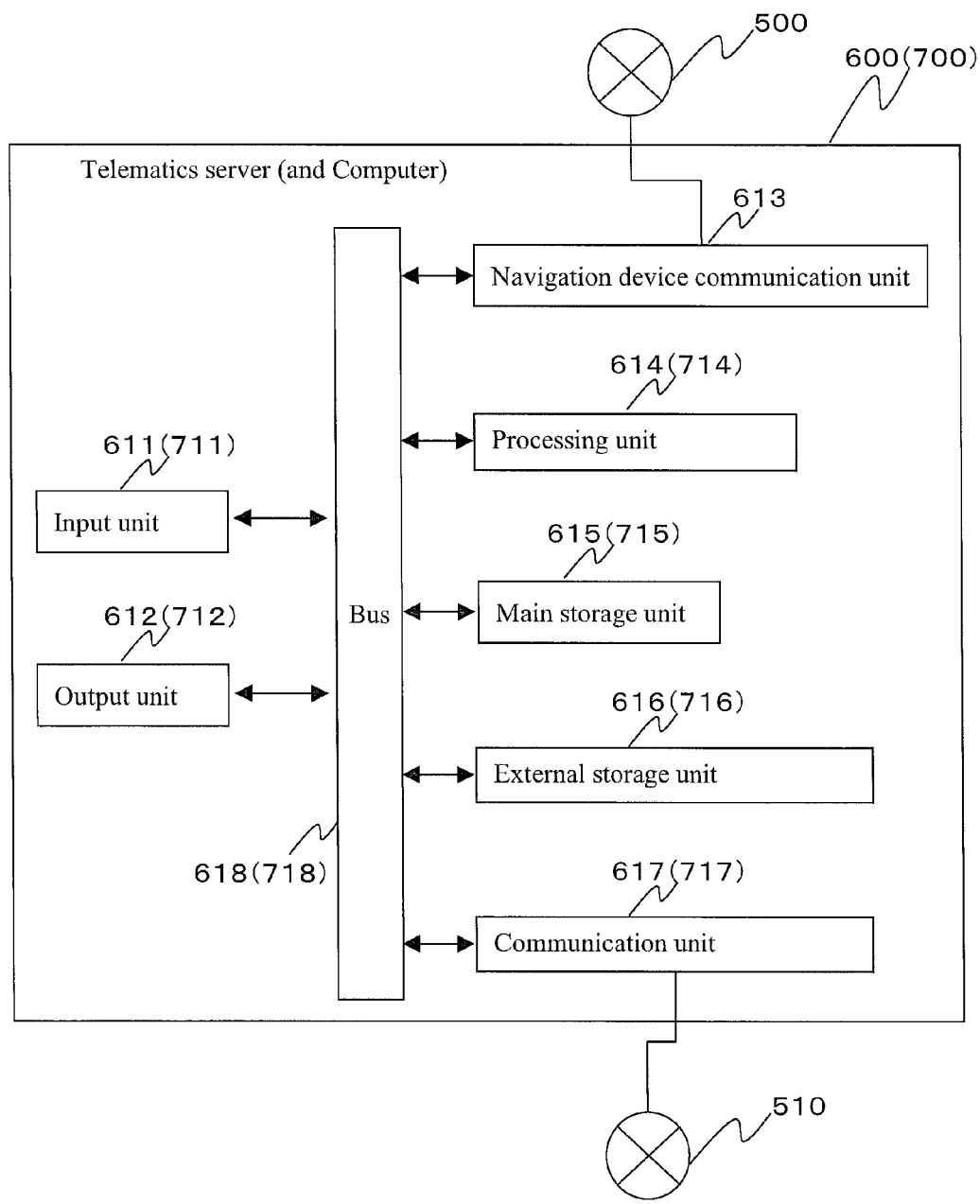
FIG. 5 is a diagram showing a hardware configuration of a telematics server.

FIG. 5 is a diagram showing a hardware configuration of the telematics server 600. The telematics server 600 comprises an input unit 611, an output unit 612, a navigation device communication unit 613, a processing unit 614, a main storage unit 615, an external storage unit 616, a communication unit 617, and a bus 618 connecting these units with one another.

The input unit 611 is a unit for receiving input, such as a keyboard, a mouse, a stylus, or another pointing device, for example.

The output unit 612 is a unit for displaying, such as a display unit. The navigation device communication unit 613 is a unit for communicating with the navigation device 100 through the navigation communication network 500. The navigation device communication unit 613 can communicate with not only the navigation device 100 but also another device connected with the navigation communication network 500.

The processing unit 614 is an operational unit such as a Central Processing Unit (CPU) for example.

The main storage unit 615 is a memory unit such as a Random Access Memory (RAM) for example.

The external storage unit 616 is a nonvolatile storage unit such as a hard disk unit or a flash memory.

The communication unit 617 is a unit for communicating with the computer 700 through the communication network 510. The communication unit 617 can communicate with not only the computer 700 but also another device connected with the communication network 510.

In the telematics server 600, the navigation connection instruction receiving part 631, the remote control operation receiving part 632, the operation instruction part 633, the navigation output acquisition part 634, the output processing part 635, the navigation monitoring part 636 and the remote control operation inhibiting part 637 are realized by a program that makes the processing unit 614 of the telematics server 600 perform processing.

This program is stored in the main storage unit 615 or the external storage unit 616, loaded into the main storage unit 615 at the time of execution, and executed by the processing unit 614.

Further, the storage part 620 of the telematics server 600 is implemented by the main storage unit 615 or the external storage unit 616 of the telematics server 600.

The navigation communication network connection part 640 of the telematics server 600 is implemented by the navigation device communication unit 613 of the telematics server 600.

The communication network connection part 650 of the telematics server 600 is implemented by the communication unit 617 of the telematics server 600.

The computer 700 is an information processing device such as a personal computer for example, and can request the telematics server 600 to establish connection with the navigation device 100. Further, the computer 700 can output on the basis of output information of the navigation device 100.

Here, the output information is sent from the telematics server 600. Further, the computer 700 can receive, as input information, a remote control operation to the navigation device 100.

As shown in FIG. 1, the computer comprises a storage part 720, a control part 730, a communication network connection part 740, an input part 741, and an output part 742.

The storage part 720 stores various types of electronic information.

The control part 730 has a browser part 731. The browser part 731 connects with the communication network 510 through the communication network connection part 740 described below, to communicate with another device connected with the communication network 510. Further, the browser part 731 receives an operation input of a user through the input part 741, and requests the output part 742 to output information to be presented to the user. For example, the browser part 731 can receive and then display a Web page or the like having modified display information such as HTML-coded information, and can send information inputted on the Web page from the user to a server of a link destination or the like.

The communication network connection part 740 connects with another device through the communication network 510, sends information to the connected device, and receives information sent from the connected device. The input part 741 receives input of information from the user. The output part 742 outputs various types of information to the user. Although not shown in the figure, the computer 700 also has a hardware configuration similar to that of the telematics server 600. However, it is not necessary for the computer 700 to have a communication unit corresponding to the navigation device communication unit 613.

Further, the browser part 731 of the computer 700 is realized by a program that makes a processing unit 714 of the computer 700 perform processing.

This program is stored in a main storage unit 715 or an external storage unit 716, loaded into the main storage unit 715 at the time of execution, and executed by the processing unit 714.

Further, the storage part 720 is implemented by the main storage unit 715 or the external storage unit 716 of the computer 700. The communication part 740 is implemented by the communication unit 717 of the computer 700. Further, the input part 741 of the computer 700 is implemented by an input unit 711 of the computer 700. The output part 742 of the computer 700 is implemented by an output unit 712 of the computer 700.

Figure 6:
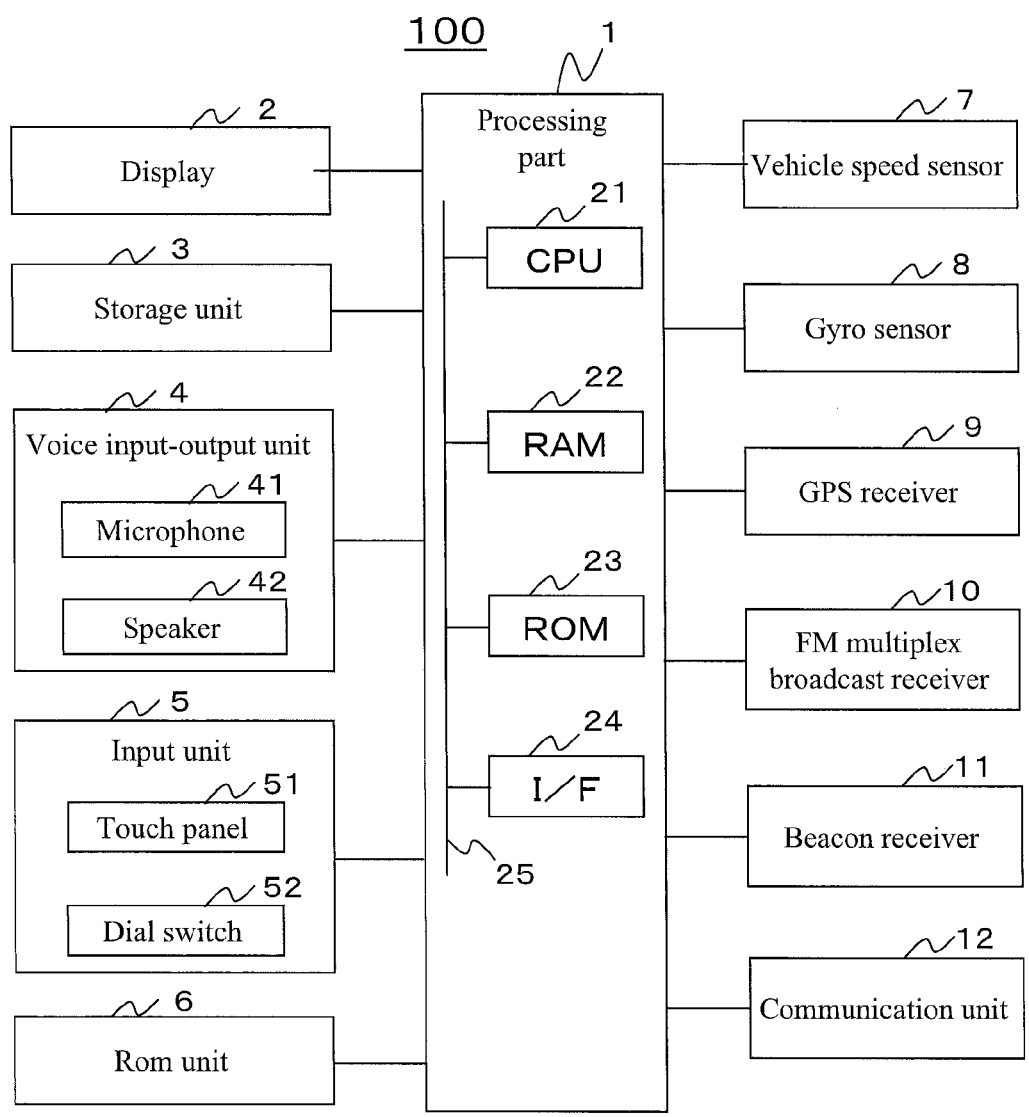
FIG. 6 is a schematic diagram showing a navigation device.

FIG. 6 is a schematic diagram showing the navigation device 100. The navigation device 100 comprises a processing part 1, a display 2, a storage unit 3, a voice input-output unit 4 (comprising a microphone 41 as a voice input unit and a speaker 42 as a voice output unit), an input unit 5, a ROM unit 6, a vehicle speed sensor 7, a gyro sensor 8, a Global Positioning System (GPS) receiver 9, an FM multiplex broadcast receiver 10, a beacon receiver 11, and a communication unit 12.

The processing part 1 is a central unit that performs various types of processing. For example, the processing part 1 detects the present location on the basis of information outputted from the various sensors 7, 8, the GPS receiver 9, the FM multiplex broadcast receiver 10 and the like. Further, based on the obtained present location information, the processing part 1 reads out map data required for displaying, from the storage unit 3 or the ROM unit 6.

Further, the processing part 1 expands the read-out map data into graphics data, and superimposes a mark indicating the present location upon the graphics data to display the result on the display 2. Further, using map data or the like stored in the storage unit 3 or the ROM unit 6, the processing part 1 searches for the optimum route (recommended route) connecting a departure place (the present location) with a destination (or a way point or a stopover point) designated by the user. Further, the processing part 1 guides the user by using the speaker 42 and/or the display 2.

Further, when the processing part 1 receives a connection request from the remotely-positioned telematics server 600, the processing part 1 performs processing of starting remote control connection, as described below. Further, when the remote control connection is started, the processing part 1 receives an instruction from the telematics server 600 until the end of the remote control connection. And, the processing part 1 performs processing corresponding to a received instruction, makes the display 2 display output information (for example, screen output information) indicating the processing result, and at the same time sends the output information to the telematics server 600.

Even during the remote control connection, the processing part 1 judges that it is not appropriate to receive a remote control operation and controls not to receive a remote control operation, for example, when the navigation device 100 is guiding through a detailed route such as an intersection or when an instruction received from the guided user is under processing.

The processing part 1 of the navigation device 100 is constructed by connecting its component units with one another through a bus 25. The processing part 1 comprises: a Central Processing Unit (CPU) 21 for performing various types of processing such as numerical operation and control of each component unit; a Random Access Memory (RAM) 22 for storing map data, operation data and the like read out from the storage unit 3; a Read-Only Memory (ROM) 23 for storing programs and data; and an interface (I/F) 24 for connecting the processing part 1 with various types of hardware.

The display 2 is a unit that displays graphics information generated by the processing part 1 or the like. The display 2 is constructed as a liquid crystal display, an organic EL display or the like.

The storage unit 3 comprises a storage medium that can at least read and write, such as a Hard Disk Drive (HDD) or a nonvolatile memory card.

This storage medium stores a link table 200 and a command conversion table 250. The link table 200 is map data (including link data of links constituting the roads on the map) required for an ordinary route search device. And the command table 200 stores information that associates a remotely-received instruction with a command to perform.

Figures 7, 8:
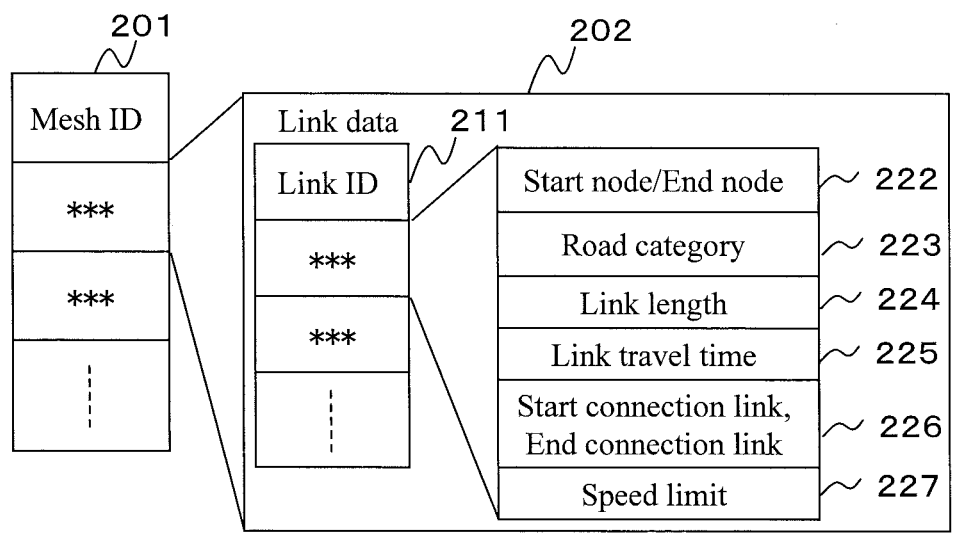
FIG. 7 is a diagram showing structure of a link table.
FIG. 8 is a diagram showing structure of a command conversion table.

FIG. 7 is a diagram showing structure of the link table 200. For each identification code (a mesh ID) 201 of a mesh as a compartment area on a map, the link table 200 contains link data 202 for each of links constituting the roads included in the mesh area.

For each link ID 211 as an identifier of a link, link data 202 includes: coordinate information 222 of two nodes (a start node and an end node) constituting the link; a road category 223, which indicates a category of the road including the link; a link length 224, which indicates the length of the link; a link travel time 225 stored previously; a start connection link and an end connection link 226, which specify a start connection link as a link connecting to the start node of the link in question and an end connection link as a link connecting to the end node of the link in question; a speed limit 227, which indicates a speed limit of the road including the link in question; and the like.

Here, the two nodes constituting a link are distinguished as a start node and an end node so that the upbound and downbound directions of the same road are managed as different links respectively.

FIG. 8 is a diagram showing structure of the command conversion table 250. The command conversion table 250 stores an instruction ID 251 and an execution command 252. The instruction ID 251 is information specifying an ID of an instruction received from the telematics server 600 or the like through the navigation communication network 500. And the execution command 252 is information specifying a command that is associated with the information stored in the instruction ID 251 and executed by the processing part 1.

The instruction ID 251 stores an identifier that identifies information specifying an ID of an instruction received from the telematics server 600 or the like through the navigation communication network 500. Further, the execution command 252 stores information that identifies a command associated with the information stored in the instruction ID 251, the command being executed by the processing part 1. For example, if the instruction ID 251 stores "scroll-up" and the execution command 252 stores "page scroll-up", then "page scroll-up" is designated as the command for performing processing corresponding to the operation ID in question.

Sometimes, together with an instruction ID, a parameter for example, a detail or degree of the instruction, such as "one page") is sent from the telematics server 600. In the command conversion table 250, such a parameter has no corresponding information into which the parameter is converted. In other words, such a parameter is treated directly as a parameter of the execution command.

The information stored in the command conversion table 250 may be previously-determined information. Or, information may be received from the telematics server 600 through the communication unit 12 or the like, so that the information stored in the command conversion table 250 is updated and maintained on the basis of the received information at an appropriate time.

Returning to FIG. 6, description will be given further. The voice input-output unit 4 comprises the microphone 41 as a voice input unit and the speaker 42 as a voice output unit. The microphone 41 obtains sound outside the navigation device 100, such as voice coming from the user or another passenger.

The speaker 42 outputs, as voice, a message that is generated by the processing part 1 for the user. The microphone 41 and the speaker 42 are placed separately at predefined positions of a vehicle. However, they may be housed in an integral case. The navigation device 100 can be provided with a plurality of microphones 41 and/or a plurality of speakers 42.

The input unit 5 is a device for receiving an instruction from the user through operation of the user. The input unit 5 is implemented by a touch panel 51, a dial switch 52, a scroll key as another hard switch (not shown), a scale change key, and the like.

The touch panel 51 is mounted on the display surface side of the display 2, and it is possible to see the display screen through the touch panel 51. The touch panel 51 specifies a touched position in relation to the X-Y coordinate of an image displayed on the display 2, converts the position into a coordinate, and outputs the obtained coordinate. The touch panel 51 is implemented by pressure-sensitive type or electrostatic type input detection elements or the like.

The dial switch 52 is constructed so as to be rotatable clockwise and counterclockwise, generates a pulse signal for each rotation of a prescribed angle, and outputs the generated pulse signals to the processing part 1. The processing part 1 obtains the angle of rotation on the basis of the number of the pulse signals.

The ROM unit 6 is implemented by a storage medium that is at least readable such as a Read-Only Memory (ROM) (including a CD-ROM or a DVD-ROM) or an Integrated Circuit (IC) card. Such a storage medium stores moving image data or voice data, for example.

The vehicle speed sensor 7, the gyro sensor 8 and the GPS receiver 9 are used for detecting the present location (i.e. the location of the vehicle itself).

The vehicle speed sensor 7 is a sensor that outputs a value used for calculating the vehicle speed.

The gyro sensor 8 is implemented by an optical-fiber gyroscope, a vibrational gyroscope, or the like, and detects an angular velocity due to turning of a moving body.

The GPS receiver 9 receives signals from GPS satellites and measures distances between a moving body and each GPS satellite and a rate of change of that distance with respect to three or more satellites, in order to measure the present location, the traveling speed and a traveling direction of the moving body.

The FM multiplex broadcast receiver 10 receives an FM multiplex broadcast signal sent from an FM multiplex broadcast station. As an FM multiplex broadcast, can be mentioned general current-state traffic information, traffic regulation information, Service Area/Parking Area (SA/PA) information, parking lot information, weather information and the like of Vehicle Information Communication System (VICS, a registered trademark) information, and textual information provided as general information by FM multiplex from a radio station.

The beacon receiver 11 receives general current-state traffic information, traffic regulation information, Service Area/Parking Area (SA/PA) information, parking lot information, weather information, emergency information and the like of, for example, the VICS information. For example, as the beacon receiver, can be mentioned an optical beacon receiver using light communication and a radio beacon receiver using radio wave.

The communication unit 12 connects with the navigation communication network 500. Such a communication unit 12 is a device that connects, for example, with a mobile telephone network in order to communicate with another device through the navigation communication network 500. For example, as such a communication unit, may be used one that can communicate when it is fitted with a user's mobile telephone.

Figure 9:
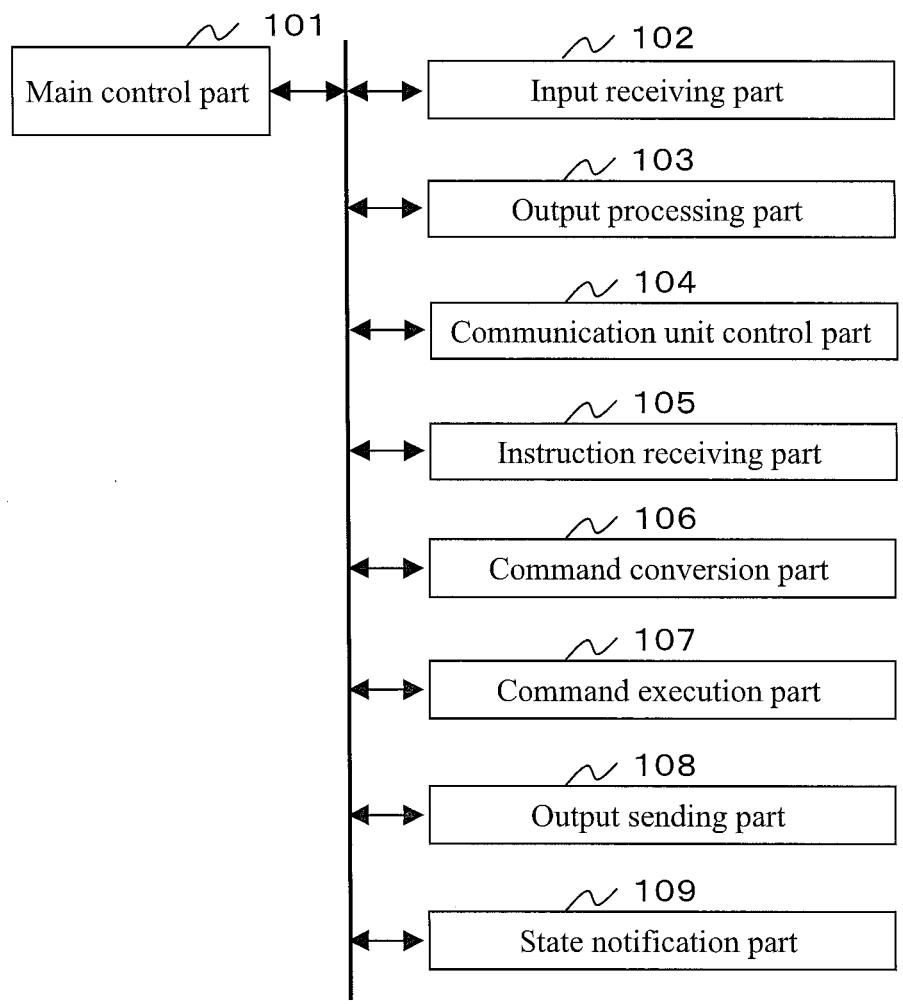
FIG. 9 is a functional configuration diagram of a processing part.

FIG. 9 is a functional block diagram showing the processing part 1. As shown in the figure, the processing part 1 comprises a main control part 101, an input receiving part 102, an output processing part 103, a communication unit control part 104, an instruction receiving part 105, a command conversion part 106, a command execution part 107, an output sending part 108, and a state notification part 109.

The main control part 101 is a central function part that performs various types of processing. The main control part 101 controls other processing part depending on a content of processing. Further, the main control part 101 obtains information of various sensors, the GPS receiver 9 and the like, and performs map matching processing and the like to specify the present location. Further, at an appropriate time, the main control part 101 associates the date and time of traveling with the location, and records a traveling history for each link in the storage unit 3. Further, in response to a request from each processing part, the main control part 101 outputs the current time. Further, the main control part 101 searches for the optimum route (recommended route) connecting a departure place (or the present location) and a destination designated by the user. Then, the main control part 101 guides the user by using the speaker 42 and the display 2 so that the user does not deviate from the recommended route. Further, the main control part 101 receives, from each processing part, processing corresponding to an execution command, and performs the received processing.

The input receiving part 102 receives an instruction inputted through the input unit 5 or the microphone 41 from the user, and controls each part of the processing part 1 so that processing corresponding to the content of the request is performed. For example, in the case where the user requests a search for a recommended route, the input receiving part 102 requests the output processing part 103 to perform processing for displaying a map for setting a destination on the display 2.

The output processing part 103 receives screen information to display (such as polygon information, for example), converts the received information into a signal for drawing on the display 2, and instructs the display 2 to perform drawing.

The communication unit control part 104 controls the communication unit 12. In detail, when the communication unit control part 104 receives a remote control connection request from another device through the communication unit 12, the communication unit control part 104 sends information that identifies the model of the navigation device 100, and performs remote control start processing. Further, when the communication unit control part 104 receives a remote control connection request, then the communication control part 104 requests the output sending part 108 to generate output information in order to obtain information on the screen displayed currently on the display 2 and to send the obtained information to the device that has sent the request. Then, the communication unit control part 104 sends the obtained output information.

The instruction receiving part 105 receives a remote control operation instruction to the navigation device 100 and a parameter of the remote control operation.

According to an instruction received by the instruction receiving part 105, the command conversion part 106 converts a remote control operation instruction to an execution command that can be executed. At that time, the command conversion part 106 uses the command conversion table 250 to identify the execution command corresponding to the received instruction.

The command execution part 107 executes the execution command converted by the command conversion part 106, while designating the parameter of the remote control operation. In detail, the command execution part 107 delivers the execution command converted by the command conversion part 106 to the main control part 101, and instructs the main control part 101 to execute the command.

The output sending part 108 obtains an output as a result of the command execution by the command execution part 107, by copying from the output processing part 103, and sends the obtained output to the telematics server 600 as the source of the remote control.

The state notification part 109 monitors the operating state of the navigation device 100 between the start and the end of the remote control. In the state that is not appropriate for receiving a remote control operation, such as during guide at an intersection requiring call of attention of the person under the route guidance or a state where an operation is receiving from the person under the route guidance through the input receiving part 102, the state notification part 109 arouses the telematics server 600 to stop the remote control operation, and makes it interrupt the remote control operation.

The above-mentioned functional parts of the processing part 1, namely, the main control part 101, the input receiving part 102, the output processing part 103, the communication unit control part 104, the instruction receiving part 105, the command conversion part 106, the command execution part 107, the output sending part 108 and the state notification part 109 are each realized when the CPU 21 reads and execute a prescribed program. To that end, the RAM 22 stores a program for realizing processing of each functional part.

The above-described components are results of classification of the configuration elements of the navigation device 100 according to the main content of processing, in order to make it easy to understand the configuration of the navigation device 100. Thus, the way of classification of the components and their names do not restrict the present invention. The configuration of the navigation device 100 can be classified into a larger number of components according to content of processing. Further, it is possible to define a component such that it performs more types of processing than those defined above.

Further, each functional part may be realized by hardware (such as ASIC or GPU). Further, processing of each functional part may be performed by one hardware unit or by a plurality of hardware units.

[Description of Operation]

Next, operation of the telematics server 600, the navigation device 100 and the computer 700 in a state where remote control is performed will be described.

Figure 10:
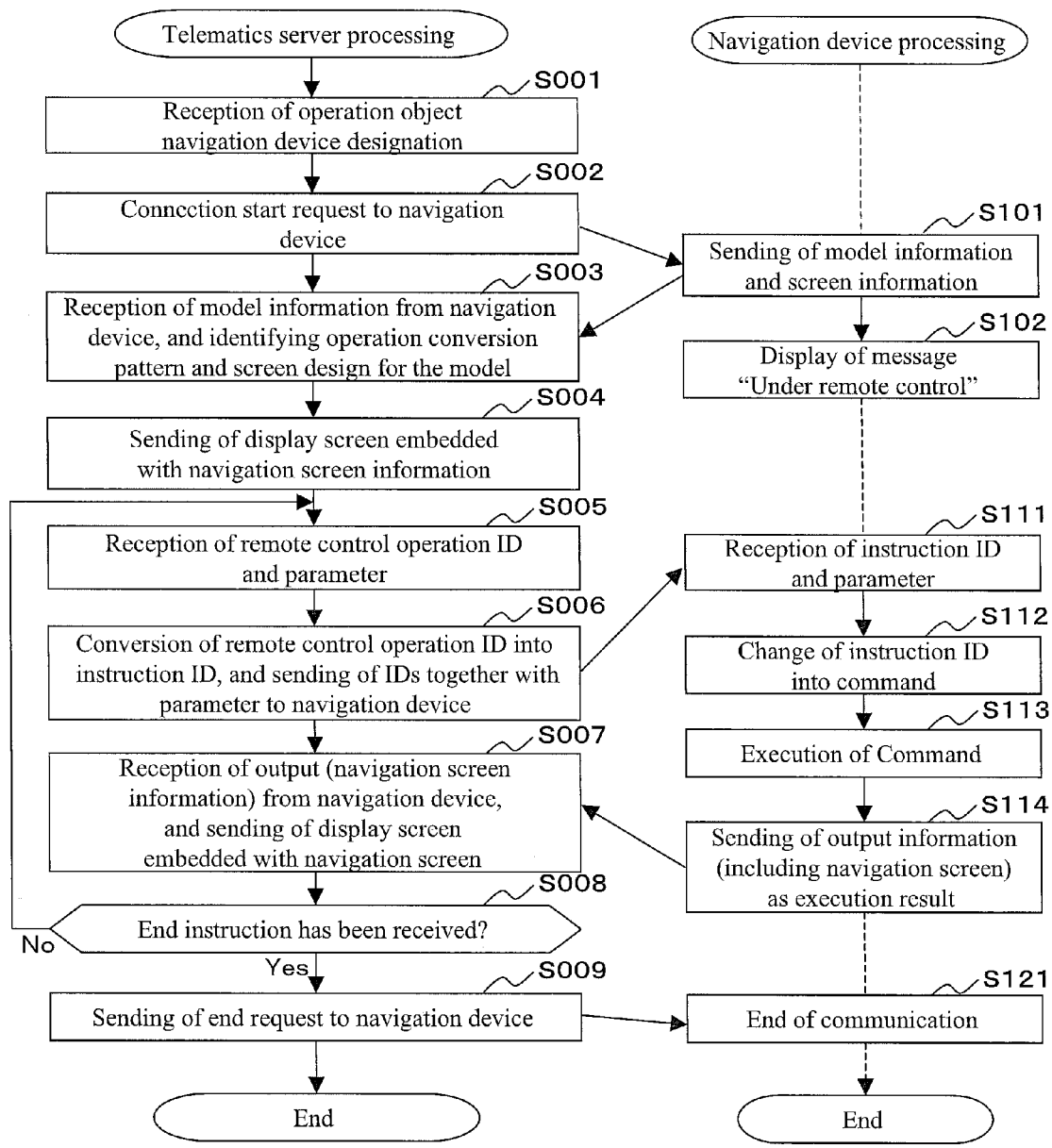
FIG. 10 is a flowchart showing remote control processing.

FIG. 10 is a flowchart showing telematics server processing performed by the telematics server that receives an instruction of remote control from the computer 700 and intercedes with the navigation device 100 for processing, and showing navigation device processing performed by the navigation device 100. This flow is started when a prescribed operation is received from the computer 700 in a state that the navigation device 100 and the telematics server 600 are in operation. For example, the flow is started when an instruction to start up a menu of remote control directed to the telematics server 600 is received from the browser part 731.

First, the navigation connection instruction receiving part 631 of the telematics server 600 receives designation of a navigation device as the object of remote control, the designation being inputted from a user via the browser part 731 of the computer 700 (Step S001). In detail, the navigation connection instruction receiving part 631 receives information identifying the navigation device 100 to connect with. For example, information specifying the connection destination in the navigation device 100, or information (such as a mobile telephone number) for connecting with the communication destination in the communication unit 12 attached to the navigation device 100.

Next, the navigation connection instruction receiving part 631 of the telematics server 600 sends a connection start request to the navigation device 100 whose designation has been received (Step S002).

Next, when the communication unit control part 104 of the navigation device 100 receives the connection start request through the communication unit 12, the communication unit control part 104 sends information specifying the model of the navigation device 100 and information displayed on the screen (the display 2) to the telematics server 600 (Step S101). Successively, the output processing part 103 of the navigation device 100 makes a message meaning "under remote control" displayed in a prescribed area of the display 2 (Step S102). By this display, the navigation device 100 can notify the guided person that the navigation device 100 is under remote control.

Receiving the information specifying the model from the navigation device 100, the navigation connection instruction receiving part 631 identifies the operation conversion pattern and the screen design according to the model. In detail, the navigation connection instruction receiving part 631 refers to the navigation model information table 400 to identify the operation conversion pattern 403 and the display screen design 404 corresponding to the model ID 402 of the communication destination.

Next, the output processing part 635 of the telematics server 600 sends a display screen, in which the received navigation screen information is embedded according to the display screen design 404, to the browser part 731 of the computer 700 (Step S004).

Next, the remote control operation receiving part 632 of the telematics server 600 receives a remote control operation ID and designation of a parameter from the browser part 731 of the computer (Step S005). For example, as the remote control operation ID and the parameter, the remote control operation receiving part 632 receives a remote control operation ID corresponding to the content "scroll-up of the map in the screen" and a parameter (such as "one page") meaning "a scrolling increment is one screenful area".

Next, the operation instruction part 633 of the telematics server 600 converts the remote control operation ID into an instruction an instruction ID, and sends the instruction ID together with the parameter to the navigation device 100 (Step S006). In detail, the operation instruction part 632 converts the remote control operation ID 412 into the instruction ID 413 associated with it in the operation conversion pattern 411 corresponding to the operation conversion pattern identified in Step S003 in the remote control operation conversion table 410. Then, the operation instruction part 633 sends the converted instruction ID and the parameter to the navigation device 100. Then, the operation instruction part 633 stores the remote control operation ID, the parameter and the instruction ID in the operation history table 420, to remain the history.

The instruction receiving part 105 of the navigation device 100 receives the instruction ID and the parameter (Step S111).

Next, the command conversion part 106 of the navigation device 100 changes the received instruction ID to a command (Step S112). In detail, the command conversion part 106 refers to the command conversion table 250 to identify the execution command 252 associated with the instruction ID 251 so as to change the received instruction ID to the identified execution command 252. For example, if the instruction ID is "scroll-up", it is changed to the execution command "page scroll-up".

Next, the command execution part 107 of the navigation device 100 executes the command obtained by such change (Step S113). In detail, the command execution part 107 sends the obtained command and the parameter to the main control part 101, to make the main control part 101 perform processing corresponding to the command. For example, the main control part 101 is made to perform the command "page scroll-up" with the designated parameter "one page".

Next, the output sending part 108 of the navigation device 100 obtains output information, which is a result of the processing by the main control part 101, from the output processing part 103, and sends the output information together with the screen information of the screen displayed on the navigation device 100 to the telematics server 600 (Step S114). For example, the output sending part 108 obtains the map screen as a result of scrolling-up by one screenful area, and sends the map screen to the telematics server 600.

Next, when the navigation output acquisition part 634 of the talematics server 600 receives the output information from the navigation device, the output processing part 635 constructs a display screen and makes it displayed on the computer 700 (Step S007). In detail, the navigation output acquisition part 634 constructs a display screen including the output information from the navigation device 100, according to the display screen design identified in Step S003. Then, the output processing part 635 sends the constructed display screen to the browser part 731 of the computer 700. For example, the output processing part 635 sends construction information of the screen 800 shown in FIG. 11.

Figure 11:
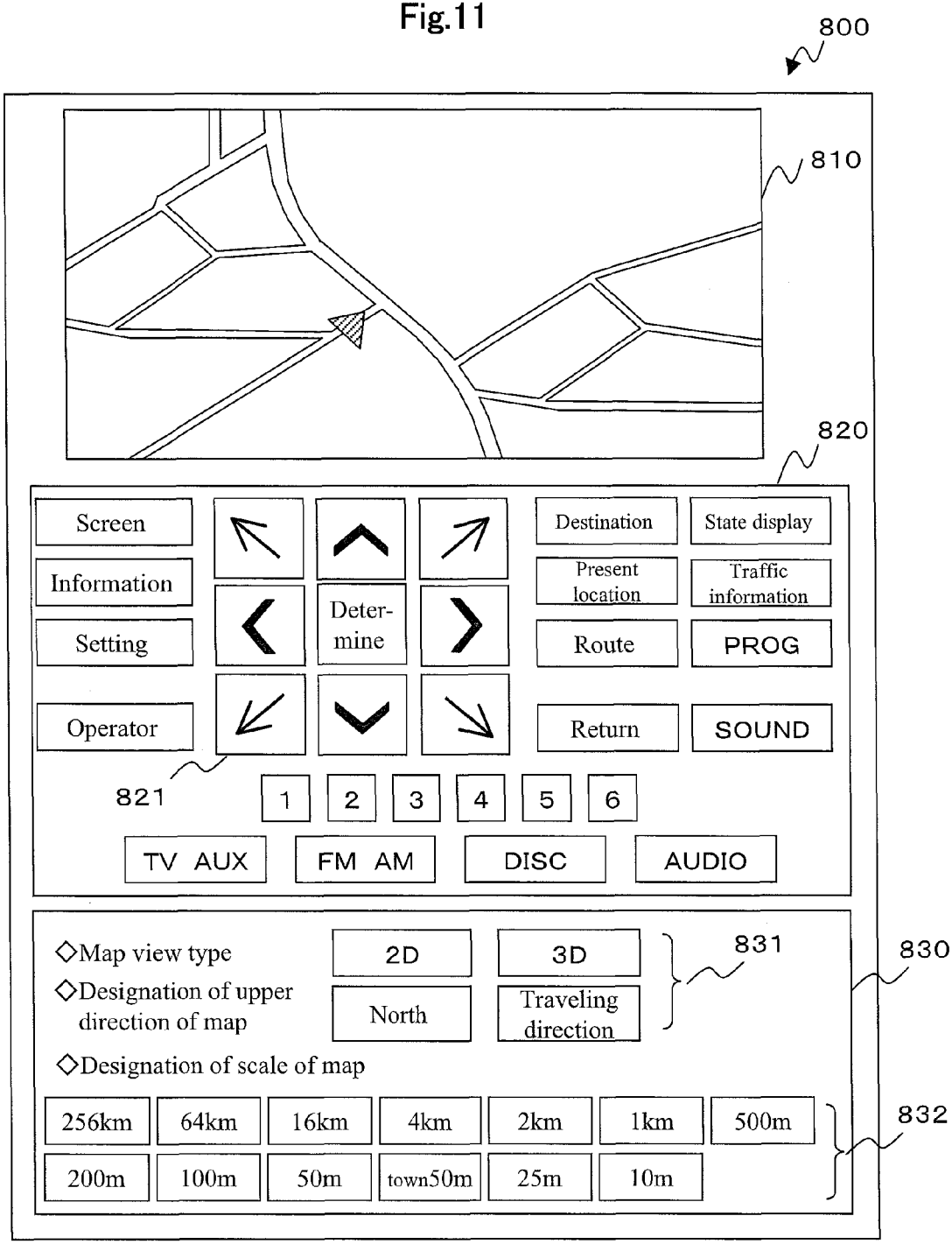
FIG. 11 shows an example of a screen for remote control processing.

FIG. 11 is a view showing an example of the screen 800 constructed by the output processing part 635. The screen 800 has a navigation device output screen display area 810, a navigation device operation input area 820, and a navigation device setting input area 830.

The navigation device output screen display area 810 displays the screen information (for example, circumferential map information including display of the self-location) constructed by the output processing part 103 of the navigation device 100. When the display screen of the navigation device changes, the screen displayed in the navigation device output screen display area 810 displays similar screen information generally interlocking with that change.

The navigation device operation input area 820 displays software switches and the like for input, which correspond to the hardware input devices (such as the dial switch and the like) provided in the main body of the navigation device 100 and can receive an operation input. For example, these are software switches and the like designed to imitate buttons on a remote controller of the navigation device 100. These software switches and the like have respective operation units similar to those of the hardware input devices of the navigation device 100. In other words, the user can remotely control the navigation device 100 by similar operation to operation of the hardware input devices.

The navigation device setting input area 830 displays software switches and the like for issuing commands that can easily change setting information of the navigation device 100. For example, a change switch 831 for changing the map view, a scale change switch 832 for changing the scale of map display, and the like are displayed.

Next, the remote control operation receiving part 632 of the telematics server 600 judges whether a remote control end instruction has been received via the browser part 731 of the computer 700 (Step S008).

If a remote control end instruction has not been received ("No" in Step S008), the remote control operation receiving part 632 returns the processing to Step S005.

If a remote control end instruction has been received ("Yes" in Step S008), the navigation connection instruction receiving part 631 sends a remote control end request to the navigation device 100, and ends the processing (Step S009).

On receiving the end request, the communication unit control part 104 of the navigation device 100 ends the remote control communication with the relematics server 600, and ends the processing.

Hereinabove, the content of the remote control processing has been described. By performing the above-described remote control processing, the navigation device 100 can receive a remote control operation from another person than the route-guided person.

In the above-described remote control processing, the telematics server 600 converts a remote control operation ID into an instruction ID, and sends the instruction ID to the navigation device 100. However, it is not restrictive. For example, it is possible to arrange that the execution command executed in Step S113 by the navigation device 100 is coincident with the remote control operation ID, so that conversion is not required. In other words, it is possible to arrange that a command of processing to be executed by the navigation device 100 is sent from the client computer 700 to the telematics server 600 through the navigation communication network, and the command in question is not converted but sent as it is to the navigation device 100. Or, the execution command executed by the navigation device 100 in Step S113 may include the parameter. By such arrangement, it is possible to reduce the processing load required for the processing of converting an execution command.

Figure 12:
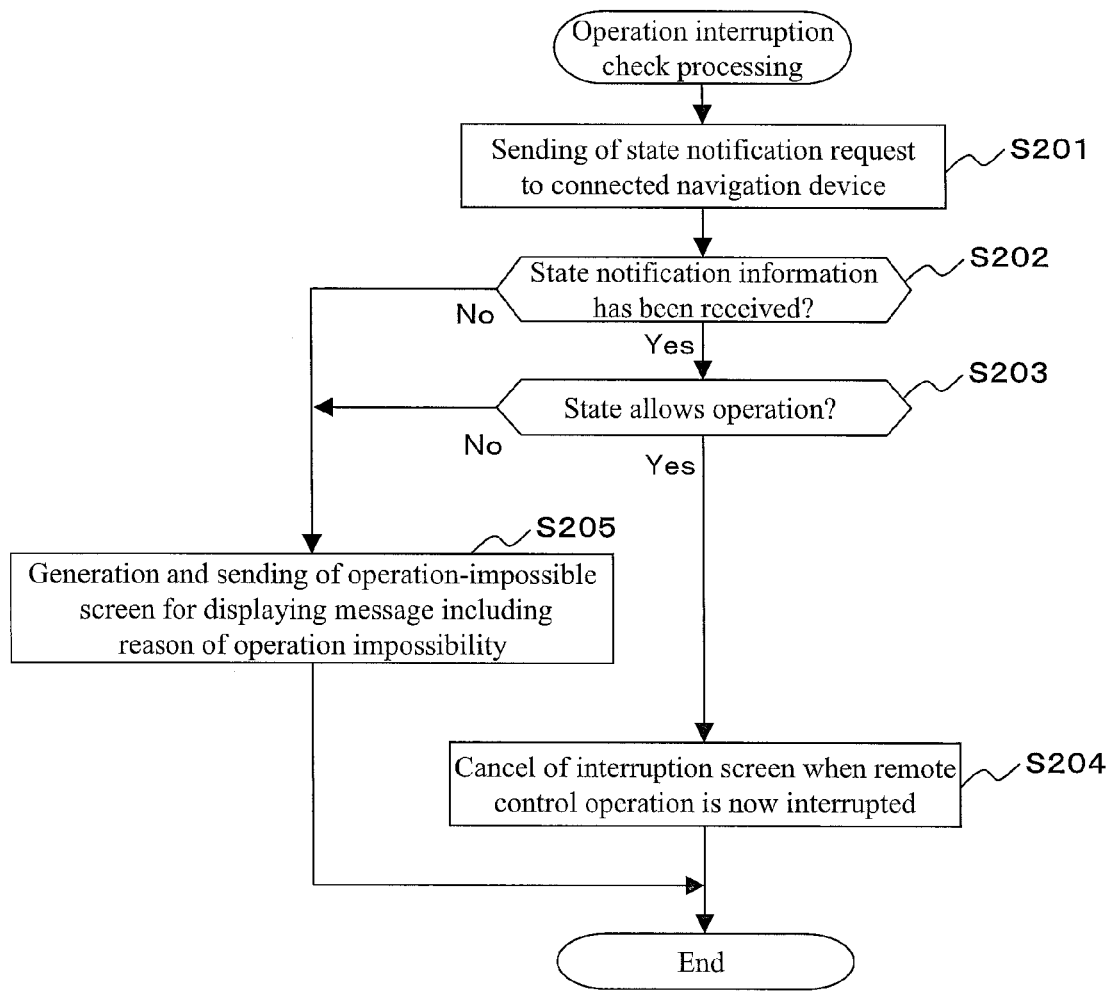
FIG. 12 is a flowchart showing operation interruption check processing.

FIG. 12 is a flowchart showing details of operation interruption check processing performed between the telematics server 600 and the navigation device 100 at prescribed intervals (for example, at intervals of 10 second) between the start of connection and end of the remote control processing.

First, the navigation monitoring part 636 of the telematics server 600 sends a state notification request to the connected navigation device (Step S201). In detail, the navigation monitoring part 636 sends information for requesting to notify the state to the navigation device 100 for which communication by the remote control processing has been started. In the case where the telematics server 600 is connected with a plurality of navigation devices 100, such requesting information is sent to some or all of the navigation devices.

Next, although not shown, when the state notification part 109 of the navigation device 100 receives the state notification request information in question through the communication unit 12, the state notification part 109 inquires of the main control part 101 as to the processing state, to judge whether it is in a state that a remote control operation can be received. Then, the state notification part 109 sends information on whether a remote control operation can be received or not and, if not, a reason of the state that cannot receive a remote control operation. As a reason of the state that cannot receive a remote control operation, there is a case where guidance of an intersection is being given to the route-guided person in the neighborhood of the intersection, or a case where the route-guided person is operating the navigation device 100, for example.

Next, the navigation monitoring part 636 of the telematics server 600 judges whether state notification information has been received or not (Step S202). In detail, the navigation monitoring part 636 monitors information sent from the navigation device 100 for a prescribed time (for example, 5 seconds), and judges whether state notification information has been received or not, depending on whether state notification information has been received in the prescribed time.

In the case where state notification information has been received ("Yes" in Step S202), the navigation monitoring part 636 judges whether the navigation device is in a state that allows remote control (Step S203). In detail, on receiving state notification information, the navigation monitoring part 636 judges that remote control is possible, if the received information notifies a state that allows remote control. If not, the navigation monitoring part 636 judges that the state does not allow remote control.

In the case where the state allows remote control ("Yes" in Step S203), the navigation monitoring part 636 judges that it is not necessary to interrupt the remote control processing, and ends the operation interruption check processing. Further, if operation is being interrupted, the remote control operation inhibiting part 637 cancels display of an interruption screen, constructs screen information that can receive an ordinary remote control operation, sends the screen to the computer 700, and ends the operation interruption check processing (Step S204).

In the case where the state does not allow remote control ("No" in Step S203), the remote control operation inhibiting part 637 generates operation-impossible screen information for displaying a message including information on the reason where the received remote control operation cannot be received, and sends the information to the computer 700 that is remotely controlling the navigation device 600 so as to make the computer display the information (Step S205). And, the operation interruption check processing is ended. Here, on receiving the operation-impossible screen information including the message, the browser part 731 of the computer 700 makes the operation-impossible screen information displayed, instead of the screen for receiving a remote control operation. As a result, receiving of a remote control operation becomes impossible.

In the case where state notification information is not received ("No" in Step S202), the navigation monitoring part 636 judges that the navigation device is in a state that does not allow a remote control operation, for example, being located at a place where communication is impossible such as a place inside a tunnel, and performs the above-described processing of Step S205. However, in the processing of Step S205, the remote control operation inhibiting part 637 displays "communication is impossible" as information on the reason why a remote control operation cannot be received.

Hereinabove, the content of the operation interruption check processing has been described. In the above description, the operation interruption check processing is performed at the prescribed intervals. However, it is not restrictive, and it is possible that the navigation device 100 sends state information to the telematics server 600 as need arises, to perform the processing of Steps S203-S205. For example, when it is expected to enter an area, such as a tunnel, where the communication state of the navigation communication network 500 is bad, it is possible that the navigation device 100 sends information to the telematics server 600 to the effect that the remote control operation is interrupted since communication failure may occur in the area. By this, it is possible to realize more precise and more delicate management of remote control.

In the above-described method, the navigation device 100 sends state information to the telematics server 600, and the telematics server 600 inhibits remote control from the client computer 700. However, without being limited to this method, the navigation device 100 may delay start of processing corresponding to the received instruction ID, depending on situations. For example, in the (previously-defined) case where it is not appropriate for the navigation device 100 to respond to a remote control operation such as during guidance at an intersection, the navigation device 100 may start the processing after returning to an appropriate state. By this, it becomes easier to avoid preventing route guidance by the navigation device 100.

Hereinabove, the first embodiment of the present invention has been described.

According to the first embodiment of the present invention, it becomes possible for another user in a remote location than a guided person to operate the navigation device 100 remotely. In other words, another user can operate the navigation device instead of a guided person. This means, for example in a car-rental system or a car-sharing system, that, for example when a driver who rents a car and is unaccustomed to the navigation device, another user such as a renter or an acquaintance of the driver can operate the navigation device for the driver, and thus route guidance by the navigation device can be enjoyed smoothly. Or, in the case where a taxi company or the like is carrying out dispatch control of vehicles under its operation control, it becomes possible for an operator of the taxi company to set a specific destination or the like, thus improving the convenience of taxi customers.

The present invention is not limited to the above-described first embodiment, and the first embodiment can be modified variously within the scope and technical spirit of the present invention. For example, in the remote control processing of the first embodiment, screens as output of results of the remote control are displayed on the display 2 of the navigation device 100 during Steps S101-S121. However, without being limited to this, it is possible to restrain display of such screens in the case of causing drastic screen transition. In detail, it is possible to restrain change of screen displayed on the display 2 of the navigation device 100 at the time of execution of specific commands. On the other hand, it is possible to arrange that screen display is changed only at the time of execution of specific commands. For example, at execution of a remote control command for scrolling a map screen, the output sending part 108 may instruct the output processing part 103 not to display a screen on the display 2. By this arrangement, it is easy to prevent diverting the attention of a guide user being distracted by drastically-transitioning screen owing to remote control.

Further, in the above-described first embodiment, the navigation device 100 receives in Step S111 an instruction ID and a parameter through the navigation communication network 500. The present invention is not limited to this. For example, a reader not shown) of an external nonvolatile storage medium may be used so that the navigation device 100 receives an instruction ID and a parameter by reading from the external storage medium that stores the instruction ID and the parameter. In that case, the instruction receiving part 105 of the navigation device 100 reads out the instruction ID and the parameter from the external storage medium, performs commands according to the read contents, and displays the execution result, i.e. screen display information, on the display 2.

Further, the parameter stored in the external storage medium may include execution conditions (such as a location, a point of time, occurrence of an event, or the like) of the processing designated by the instruction ID. By this, it is possible, for example, to carry out a way-point setting instruction under an execution condition that a destination has been already set.

Further, in the above first embodiment, the navigation device 100 sends in Step S114 output information, i.e. the result from an executed command, to the telematics server 600. However, the output information may be sent together with control information or the like managed by the navigation device 100. For example, in the case where the navigation device 100 is mounted on a vehicle, information indicating a state of the vehicle (for example, a control state of a preset temperature of an air conditioner) may be sent as control information. And, it is possible to arrange that the telematics server 600 includes the control information in the information displayed in the screen 800 constructed in Step S007, and displays a software switch for changing setting of the control information, so that a remote control operation ID is received by receiving an operation of that software switch. By this arrangement, it becomes possible to operate, in the remote control processing, also an object (a device) under the control of the navigation device 100.

Further, in the first embodiment described above, all or some of the above-mentioned techniques of the invention may be combined with the navigation device 100.

Further, in the above-described first embodiment, the client computer 700 and the telematics server 600 are different devices. However, the present invention is not limited to this, and for example the client computer 700 may provided with components similar to those of the telematics server 600 so that the client computer 700 can fulfill functions similar to those of the telematics server 600.

Hereinabove, the present invention has been described centering on the embodiments.

The above embodiments have been described as cases where the present invention is applied to a navigation device. However, the present invention is not limited to a navigation device, and can be generally applied to devices that perform route guidance of a moving body.

EXPLANATION OF REFERENCES

1 . . . . Processing part, 2 . . . . Display, 3 . . . . Storage unit, 4 . . . . Voice input-output unit, 5 . . . . Input unit, 6 . . . . Rom unit, 7 . . . . Vehicle speed sensor, 8 . . . . Gyro sensor, 9 . . . GPS receiver, 10 . . . FM multiplex broadcast receiver, 11 . . . . Beacon receiver, 12 . . . . Communication unit, 21 . . . CPU, 22 . . . RAM, 23 . . . ROM, 24 . . . I/F, 25 . . . BUS, 41 . . . Microphone, 42 . . . . Speaker, 51 . . . . Touch panel, 52 . . . . Dial switch, 100 . . . Navigation device, 101 . . . Main control part, 102 . . . Input receiving part, 103 . . . Output processing part, 104 . . . Communication unit control part, 105 . . . Instruction receiving part, 106 . . . Command conversion part, 107 . . . Command execution part, 108 . . . Output sending part, 109 . . . State notification part, 200 . . . Link table, 250 . . . Command conversion table, 400 . . . Navigation model information table, 410 . . . Remote control operation conversion table, 420 . . . Operation history table, 500 Navigation communication network, 510 . . . Communication network, 600 . . . Telematics server, 620 . . . Storage part, 630 . . . . Control part, 631 . . . Navigation connection instruction receiving part, 632 . . . Remote control operation receiving part, 633 . . . Operation instruction part, 634 . . . Navigation output acquisition part, 635 . . . Output processing part, 636 . . . Navigation monitoring part, 637 . . . Remote control operation inhibiting part, 640 . . . Navigation communication network connection part, 641 . . . . Communication network connection part, 700 . . . Computer, 720 . . . . Storage part, 730 . . . Control part, 731 . . . . Browser part, 740 . . . . Communication network connection part, 741 . . . Input part, 742 . . . Output part, 1000 . . . . Navigation system

The invention claimed is:

1. A navigation device, comprising:
a processor; and
a memory storing computer readable instructions that, when executed by the processor, implement:
an instruction receiving unit adapted to receive, from an external device, a processing instruction;
a processing unit adapted to perform processing according to the instruction received by the instruction receiving unit; and
an output unit adapted to output information obtained as a result of the processing performed by the processing unit;
wherein the computer readable instructions, when executed by the processor, further implement a communication unit adapted to communicate with the external device through a communication network;

wherein the instruction receiving unit is adapted to receive a processing instruction from the external device through the communication unit;

wherein the output unit is adapted to send output information obtained as a result of the processing performed by the processing unit to the external device through the communication unit;

wherein the computer readable instructions, when executed by the processor, further implement a state notification unit adapted to send, to the external device, a judgment specifying whether the navigation device is in a state allowing receipt of a processing instruction from the external device;

wherein, once the navigation device has been turned on and has been in communication with the external device, the state notification unit is adapted to send the judgment independently of an action of a user of the navigation device; and wherein, when the navigation device is in a process of performing a route guidance, the judgment sent from the state notification unit specifies that the navigation device is not in a state allowing receipt of a processing instruction from the external device.

2. The navigation device of claim 1, wherein:

the computer readable instructions, when executed by the processor, further implement an input receiving unit adapted to receive an input instruction; and the processing instruction received by the instruction receiving unit is an instruction corresponding to the input instruction received by the input receiving unit.

3. The navigation device of claim 1, wherein:

the navigation device further comprises a display;

the output information sent by the output unit is information on screen display; and the output unit makes the output information displayed on the display if a prescribed condition is satisfied, and inhibits the output information from being displayed on the display if the prescribed condition is not satisfied.

4. The navigation device of claim 3, wherein:

the prescribed condition is that display of the output information would not divert attention of a user of the navigation device.

5. The navigation device of claim 1, wherein:

when a prescribed condition is not satisfied, the processing unit refrains from performing the processing until the prescribed condition is satisfied; and when the prescribed condition is satisfied, the processing unit performs the processing.

6. The navigation device of claim 1, wherein the computer readable instructions, when executed by the processor, further implement a communication impossibility notification unit adapted to notify the external device of information to the effect that communication becomes impossible, at a time of entering an area where communication through the communication unit becomes impossible.

7. The navigation device of claim 1, wherein:

the state notification unit is adapted to monitor whether the navigation device is in a state allowing receipt of a processing instruction from the external device; and the state notification unit is adapted to send the judgment based on a result of the monitoring.

8. The navigation device of claim 1, wherein the state notification unit is adapted to send the judgment in response to a state notification request received from the external device.

9. A program for a navigation device, wherein:

the navigation device comprises a control unit; and the program makes the control unit carry out:

an instruction receiving step, in which a processing instruction is received from an external device;

a processing step, in which processing according to the instruction received in the instruction receiving step is performed; and an output step, in which output information obtained as a result of the processing performed in the processing step is outputted;

wherein the program further makes the control unit carry out a communication step to communicate with the external device through a communication network;

wherein the instruction receiving step receives a processing instruction from the external device via the communication step; and wherein the output step sends output information obtained as a result of the processing performed by the processing step to the external device via the communication step; and wherein the program further makes the control unit carry out:

a state notification step to send, to the external device, a judgment specifying whether the navigation device is in a state allowing receipt of a processing instruction from the external device;

wherein, once the navigation device has been turned on and has been in communication with the external device, the state notification step sends the judgment independently of an action of a user of the navigation device; and wherein, when the navigation device is in a process of performing a route guidance, the judgment sent by the state notification step specifies that the navigation device is not in a state allowing receipt of a processing instruction from the external device.

10. The program of claim 9, wherein:

the state notification step monitors whether the navigation device is in a state allowing receipt of a processing instruction from the external device; and the state notification step sends the judgment based on a result of the monitoring.

11. The program of claim 9, wherein the state notification step sends the judgment in response to a state notification request received from the external device.

* * * * *